United States Patent [19]
Harrington

[11] 3,956,544
[45] May 11, 1976

[54] TUBULAR PACKAGE

[75] Inventor: Frank C. Harrington, Danville, Ill.

[73] Assignee: Tee-Pak, Inc., Chicago, Ill.

[22] Filed: Nov. 6, 1974

[21] Appl. No.: 521,303

[52] U.S. Cl.................................. 428/36; 138/119; 138/128; 138/137; 206/525; 222/107; 426/124; 426/127; 426/135; 426/512; 426/516; 428/57; 428/189; 428/509; 428/510; 428/518; 428/520; 428/910

[51] Int. Cl.².................... F16L 11/04; B32B 1/08; B32B 3/18

[58] Field of Search............. 161/402; 428/36, 127, 428/129, 57, 189, 336, 337, 518, 520, 509, 510, 910; 138/119, 128, 137; 222/107; 206/525; 426/124, 127, 135, 512, 516, 582, 420; 229/3.5 R

[56] References Cited
UNITED STATES PATENTS

| | | | |
|---|---|---|---|
| 3,037,868 | 6/1962 | Rosser | 161/402 |
| 3,248,040 | 4/1966 | Friedman | 229/3.5 R |
| 3,250,384 | 5/1966 | Perino | 161/402 |
| 3,445,324 | 5/1969 | Curler | 161/402 |
| 3,539,439 | 11/1970 | Calderwood | 161/402 |
| 3,607,519 | 9/1971 | Beyer | 161/190 |
| 3,630,826 | 12/1971 | Rose | 161/231 |
| 3,753,828 | 8/1973 | Manne | 161/254 |
| 3,775,217 | 11/1973 | Blake | 161/402 |

*Primary Examiner*—William J. Van Balen
*Assistant Examiner*—Ellis P. Robinson
*Attorney, Agent, or Firm*—Paul Shapiro; Joseph E. Kerwin; William A. Dittmann

[57] ABSTRACT

This invention relates to a tubular mold having excellent resistance to stretch. The mold is a "duplex type" flexible tubular mold comprising an outer film laminate comprising:
a first film ply of cellophane having a saran film bonded to its outer and inner surfaces;
a second film ply of biaxially oriented polypropylene having saran coatings bonded to its outer and inner surfaces, the film ply being bonded to the coated cellophane by an adhesive; and
an inner film laminate comprising a film ply of biaxially oriented polypropylene having a saran coating on both sides.

3 Claims, 2 Drawing Figures

TUBULAR PACKAGE

BACKGROUND OF THE INVENTION

There are a wide variety of flexible tubular molds made of various polymeric films for the packaging of food products or other items. In recent years, a duplex type mold which is a double wall package has been developed for the packaging of food products. The duplex type molds offer the advantage of increased strength over the single layer film packages because the inner wall of the duplex film can absorb much of the stress.

A number of film packages on the market today which comprise a laminate of dissimilar materials such as a laminate of cellophane bonded to a polyolefin such as polyethylene or polypropylene and coated with a moisture impervious material. These packages including those of the duplex type do not have the desired rigidity and strength necessary for packaging of certain types of food items. This is particularly true in the manufacture of cheese wherein a cheese curd is extruded through a nozzle into the flexible tubular mold and allowed to knit and then the mold removed from the cheese product.

SUMMARY OF THE INVENTION

This invention relates to an improvement in flexible tubular packaging which comprises:

an outer film laminate comprising a film ply of cellophane having a saran coating bonded to its outer surface and a saran coating bonded to its inner surface and a film ply of biaxially oriented polypropylene having a saran coating on both of its surfaces and bonded to the saran coated cellophane by an adhesive; and an inner film laminate comprising biaxially oriented polypropylene having a saran coating on both sides.

The duplex type flexible tubular mold described herein which is highly desirable for the processing of cheese and the packaging of other food products has many advantages over flexible molds employed in the past.

These advantages include:

a tough, flexible tubular mold which can be shirred without prior wetting of the mold;

a flexible tubular mold which has an excellent dimensional stability, e.g., 0.5% for a 5–6 inch diameter mold and 1–2% for a 2–3 inch diameter mold measured at stuffing pressures of 5 and 10 psig respectively;

a flexible tubular mold having substantial elasticity at pressures above desired stuffing pressures for resisting breakage should process conditions become irregular;

a flexible tubular mold which has excellent resistance to tearing by burrs and other sharp objects;

a flexible tubular mold which has sufficient lubricity for easy processing in commercial equipment; and a flexible tubular mold which has extremely low resistance to moisture and gas transmission for retaining moisture in the food products packaged therein and preventing oxidation thereof.

THE DRAWINGS

DESCRIPTION OF THE PREFERRED EMBODIMENTS

Figure 1:
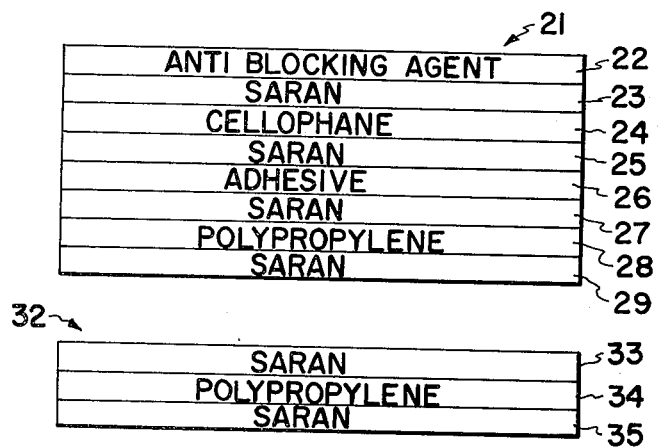
FIG. 1 is a view in elevation of the laminates used for making the flexible tubular mold.

In referring to the drawings, FIG. 1 represents a view in elevation of the two laminates used for forming the duplex type flexible tubular mold which is highly suited for the packaging of food products. The package is particularly adapted for the processing of cheese wherein the cheese curd is extruded through a die into the mold at pressures of from about 5–10 psig. Outer laminate 21 comprises a cellophane ply 24 and a biaxially oriented polypropylene ply 28 as the major components of the laminate. Both the cellophane ply and polypropylene ply have a thin film or coating of saran on its outer and inner surfaces. This is represented by saran coatings 23 and 25 on the cellophane ply and 27 and 29 on the polypropylene ply.

Generally, for ease of processing, the outer saran coating on the cellophane ply, namely coating 23, has an anti-sticking or anti-blocking (release) agent 22 coated thereon. These release or anti-blocking agents are commonly used in the food packaging area where saran coatings are employed. Such anti-blocking or release agents include: alkyl sulfates, alkyl sulfonates such as sodium lauryl sulfonate, and polyethylene imine. The proportions of anti-blocking or release agents for improving lubricity of the saran coated films through process equipment are conventional and well known in the art.

The saran coated cellophane ply 24 and saran coated biaxially oriented polypropylene ply 28 are bonded together to form an outer laminate 21. Generally, the bonding of the two film plies is accomplished by means of an adhesive designated 26 in FIG. 1. The adhesive should have sufficient strength for bonding the cellophane and polypropylene plies together so that they can withstand the stress imposed during processing, e.g., stuffing with a cheese curd or other food emulsion, and yet have sufficient flexibility so that when the resulting laminate is stressed the cellophane ply does not separate from the polypropylene ply. Classes of adhesives which can be used for practicing the invention include: urea aldehyde, melamine formaldehyde, polyalkylene polyamine, polymeric polyisocyanates, polymeric isocyanates, polyurethane isocyanates (such isocyanates can be crosslinked with a polyol or other crosslinking agent) or polyamide epichlorohydrin resins. Such adhesives are well known in the art for bonding such polymeric films.

The inner film laminate 32 comprises a biaxially oriented polypropylene 34 having saran coatings 33 and 35 bonded to its outer and inner surfaces.

The unique combination of film components in the outer and inner film laminate produces a flexible tubular mold of the duplex type which has excellent dimensional stability, flexibility, and toughness. The cellophane ply or ply of regenerated cellulose adds substantial dimensional stability to the flexible tubular mold which is not obtained from molds which do not incorporate the cellophane or regenerated cellulose ply.

Polypropylene film is used in forming the outer and inner film laminate of the duplex mold and is necessary for providing toughness and flexibility to the mold. The polypropylene film must be biaxially oriented so that the properties are substantially isotropic. The use of a polypropylene film which is not biaxially oriented does not provide the isotropic dimensional stability required in the duplex molds for the processing of foods which require the dimensional stability afforded by the duplex molds of this invention. Other polyolefin films cannot be substituted for the biaxially oriented polypropylene film without sacrificing strength and toughness. For example, polyethylene has been substituted for the biaxially oriented polypropylene in both the outer and inner laminates but the resulting flexible tubular mold does not have the toughness and stretch resistance required for commercial acceptance.

These saran coatings on the cellophane and polypropylene have extremely low permeability to moisture and gas transmission, e.g., less than about 1 cc/100 in.$^2$/24 hour-atm. (at 60°F.). The use of a saran coating does essentially four things for the mold. The first is that it provides for moisture and vapor retention in the food products which is packaged therein. Secondly, the films inhibit oxygen transmission and subsequent oxidation of the food product. Thirdly, the saran coatings serve as a means for sealing the mold. Fourthly, the saran coatings on the cellulose film keep the cellophane or regenerated cellulose ply in a "dry state" which maintains dimensional stability of that film. As is known, cellophane or regenerated cellulose films lose their dimensional stability and stretch resistance when wet.

Figure 2:
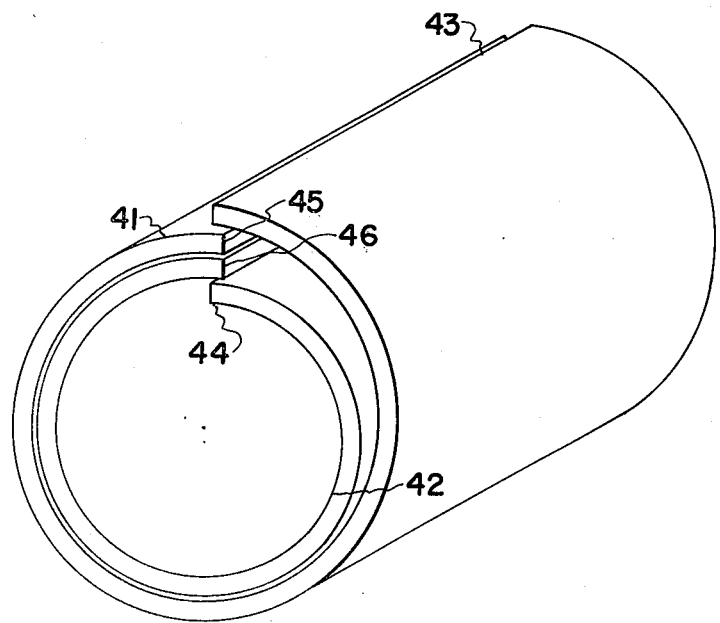
FIG. 2 is an oblique view of the flexible tubular mold formed from the laminates described in FIG. 1 with particular emphasis on the construction and sealing of the mold.

Referring to FIG. 2, there is shown an oblique view of the film laminates of FIG. 1, positioned to show the construction of the seam for the duplex type tubular mold. More particularly, outer laminate 41 and inner laminate 42 are laid one over the other and formed into a tubular shape. Edges 45 and 46 of the outer and inner film laminate, respectively, are pressed together and disposed between opposite edges 42 and 44 of the respective outer and inner laminates. In other words, one end of the outer and inner laminate is sandwiched and sealed between the opposite ends of the outer and inner laminate. The seal is effected by heat sealing, taking advantage of the compatibility of the saran coatings for heat sealing. A "lap seal" wherein the edges of the inner and outer laminate are laid over the opposite edges of the laminates does not afford the commercial advantages in terms of the strength desired for some types of food packages.

In the duplex tubular mold the regenerated cellulose film or ply has a thickness of from about 0.8–1.6 mils. The biaxially oriented polypropylene film typically has a thickness of from about 0.5–1.5 and preferably about 0.8–1.2 mils. Any thicknesses larger or smaller than the range indicated for both the regenerated cellulose or cellophane ply and the biaxially oriented polypropylene ply tends to create problems in terms of strength at the reduced thickness and stress cracking at the larger thicknesses.

The saran coatings which are applied to the regenerated cellulose or cellophane ply and the biaxially oriented polypropylene present in both the outer and inner laminate is primarily used for providing resistance to moisture and vapor loss from the food product to prevent oxygen permeation of the package and the deleterious effects on the product and to provide a convenient means for sealing the package. These saran coatings typically are from about 0.1–0.3 mils in thickness. The following example is provided to illustrate preferred embodiments of the invention and are not intended to restrict the scope thereof.

EXAMPLE 1

The outer film laminate for the duplex tubular mold comprises a regenerated cellulose ply having a thickness of 1 mil having a saran coating of 0.1 mil applied to both its inner and outer surface. Polyethyleneimine is applied to the outer surface of the saran coating in a proportion of about 7 mg per square meter for producing a release or anti-blocking effect on the surface. This anti-blocking agent also acts as a lubricating agent.

A biaxially oriented polypropylene ply having a thickness of 1 mil has saran coatings of 0.1 mil applied to both of its surfaces. This saran coated polypropylene ply is bonded to the saran coated regenerated cellulose film at the inner surface by a polyurethane polyisocyanate resin sold under the Trademark Adcote 301–350 by Morton Chemical Company.

The inner laminate of the duplex package consists of a biaxially oriented polypropylene film having a thickness of 1 mil with saran coatings of 0.1 mil applied to both of its surfaces.

The duplex package is formed by disposing edges of the outer and inner laminate of the film between the opposite edges of the outer and inner laminate as noted in FIG. 3. The duplex package then is sealed by the thermal means. The package which has a diameter of 5 inches is cut to a length of 6 feet and clipped at an end to provide a tubular mold of about 6 feet in length. The resulting mold has excellent resistance to tearing and excellent resistance to stretch (0.5%) when stuffed with a cheese curd at a pressure of 10 psig. The package withstands a pressure of slightly over 20 psig without breakage.

What is claimed is:

1. A duplex tubular mold particularly adapted for the packaging of food products which comprises a pair of curved separate films unadhered to each other over major contacting surfaces and heat sealed at the edges to form a duplex tube, the outer film of said tube being a laminate consisting of a first film ply of cellophane having a thickness of from about 0.8–1.6 mils and having saran coatings on the outer and inner surfaces and a second film ply consisting of biaxially oriented polypropylene having a thickness of from about 0.5–1.5 mils with saran coatings on the outer and inner surfaces, the saran coated cellophane ply and biaxially oriented polypropylene ply being adhesively laminated, at the inner surface of the said cellophane ply and the inner film of said tube being a laminate consisting of biaxially oriented polypropylene having a thickness of from about 0.5–1.5 mils coated with saran on both sides.

2. The duplex tubular mold of claim 1 wherein said adhesive is a polyurethane polyisocyanate resin.

3. The duplex mold of claim 2 wherein the thickness of the saran coatings on said cellophane ply and biaxially oriented ply in the outer laminate and biaxially oriented polypropylene ply in the inner laminate is from about 0.1–0.3 mils.

* * * * *